(12) United States Patent
Michel et al.

(10) Patent No.: US 10,577,998 B2
(45) Date of Patent: Mar. 3, 2020

(54) METHOD FOR CONTROLLING A REGENERATION OF A PARTICLE FILTER OF AN INTERNAL COMBUSTION ENGINE

(71) Applicant: GM GLOBAL TECHNOLOGY OPERATIONS LLC, Detroit, MI (US)

(72) Inventors: Alexander Michel, Rheinboellen (DE); Rafat F. Hattar, Royal Oak, MI (US); Jochen Grieser, Seligenstadt (DE); Daniel Siebert, Mainz (DE); Maximilian Melling, Muenster (DE); Simon Schiesser, Mainz (DE); Markus Kraft, Bad Camberg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/995,231

(22) Filed: Jun. 1, 2018

(65) Prior Publication Data
US 2018/0347434 A1 Dec. 6, 2018

(30) Foreign Application Priority Data

Jun. 1, 2017 (DE) .......... 10 2017 005 234

(51) Int. Cl.
| | |
|---|---|
| *F01N 3/023* | (2006.01) |
| *F01N 3/027* | (2006.01) |
| *F01N 11/00* | (2006.01) |
| *F01N 9/00* | (2006.01) |

(52) U.S. Cl.
CPC .......... *F01N 11/00* (2013.01); *F01N 9/002* (2013.01); *F01N 9/005* (2013.01); *F01N 2560/025* (2013.01); *F01N 2560/08* (2013.01); *F01N 2560/14* (2013.01); *F01N 2900/0402* (2013.01); *F01N 2900/102* (2013.01); *F01N 2900/1402* (2013.01); *F01N 2900/1406* (2013.01); *F01N 2900/1606* (2013.01); *F01N 2900/1611* (2013.01)

(58) Field of Classification Search
CPC .............. F01N 11/00; F01N 2560/025; F01N 2560/08; F01N 2560/14; F01N 2900/0402; F01N 2900/102; F01N 2900/1402; F01N 2900/1406; F01N 2900/1606; F01N 2900/1611; F01N 9/002; F01N 9/005
See application file for complete search history.

(56) References Cited

U.S. PATENT DOCUMENTS

| | | | | |
|---|---|---|---|---|
| 2005/0044846 A1* | 3/2005 | Yahata | .............. | B01D 46/0086 60/295 |
| 2009/0126347 A1* | 5/2009 | Gabe | .................. | B01D 53/9495 60/285 |
| 2018/0094556 A1* | 4/2018 | Kurtz | .................... | F02D 41/029 |

* cited by examiner

*Primary Examiner* — Anthony Ayala Delgado
(74) *Attorney, Agent, or Firm* — Lorenz & Kopf, LLP

(57) ABSTRACT

A method and system controls a regeneration of a particle filter of an internal combustion engine. A first value is measured for the oxygen content in exhaust gas upstream from the particle filter. A second value is measured for the oxygen content in exhaust gas downstream from the particle filter. The particle filter is determined to be free of soot when the second value for the oxygen content is equal to the first value for the oxygen content.

10 Claims, 2 Drawing Sheets

METHOD FOR CONTROLLING A REGENERATION OF A PARTICLE FILTER OF AN INTERNAL COMBUSTION ENGINE

CROSS-REFERENCE TO RELATED APPLICATION

This application claims priority to German Patent Application No. 102017005234.4, filed Jun. 1, 2017, which is incorporated herein by reference in its entirety.

TECHNICAL FIELD

The present disclosure pertains to an internal combustion engine, for example to an internal combustion engine of a motor vehicle, which is provided with a particle filter. More particularly, the present disclosure relates to a method for controlling a regeneration of the particle filter.

BACKGROUND

It is known that many internal combustion engines, including positive-ignition engines (e.g., gasoline engines), are usually provided with a particle filter for collecting particulate matter (soot) generated by the engine, to lower pollutant emissions.

The soot that accumulated inside of the particle filter is removed from time to time in a soot combustion process, which is generally referred to as regeneration (e.g., active regeneration or passive regeneration), that occurs when the temperature of the particle filter exceeds a specific value (e.g., 500° C.) and sufficient oxygen is present in the exhaust gases. The known strategies for controlling particle filter regeneration are based on measurements of the pressure difference in the particle filter and/or mathematical models configured to provide a soot load estimate based on several different operating parameters.

However, there exists a need to improve the control of particle filter regeneration, and to precisely determine whether the particle filter is completely free of soot, for example at the end of a regeneration process, and to adjust and correct the estimated soot load and/or ash that accumulates in the particle filter over its service life.

SUMMARY

In accordance with the present disclosure a method is provided for controlling regeneration of a particle filter of an internal combustion engine in which a first value is measured for the oxygen content in exhaust gas upstream from the particle filter, and a second value is measured for the oxygen content in exhaust gas downstream from the particle filter. A determination is made that the particle filter is free of soot when the second value for the oxygen content is equal to the first value for the oxygen content. The method can advantageously be applied in conjunction with the known strategies for monitoring the soot and/or ash load in the particle filter, such as methods based on the pressure difference in the particle filter and/or based on the estimation of mathematical models, to precisely determine a "start condition" (i.e., "clean filter") from which the strategies can begin to calculate the soot load. As a result, the strategies for monitoring the soot load as well as the entire management of the regeneration process can become more precise, which also means that the fuel consumption and/or the danger of failures due to an overloaded particle filter can be lowered.

In one aspect, the method may calculate a value for the quantity of soot that was combusted during the regeneration of the particle filter from when regeneration began to the time at which the particle filter was found to be free of soot, based on the measured first value and the measured second value for the oxygen content. The calculated value for is used the quantity of soot to correct a mathematical model for estimating a quantity of soot collected in the particle filter. As a result, a calculated value for the quantity of soot that was actually combusted during regeneration can be provided at the end of each regeneration, so that this actual, calculated value for the quantity of soot that was actually combusted can be compared with the soot load that was estimated by the mathematical models and/or based on measurements of the pressure difference in the particle filter, wherein a suitable strategy for correcting the estimation models can be applied in the case of discrepancies between the estimated value and actual, calculated value. Therefore, this aspect has the effect of enabling an adaptive correction of the mathematical models used for estimating the soot load based on measurements of the oxygen content.

In one aspect, the method of calculating the value for the quantity of soot combusted during the regeneration of the particle filter may calculate a first mass oxygen throughput based on the measured first value for the oxygen content, and calculate a second mass oxygen throughput based on the measured second value for the oxygen content. The difference between the second mass oxygen throughput and first mass oxygen throughput is integrated over a period of regeneration. Accordingly, a very reliable solution is provided for calculating the quantity of soot that is combusted during regeneration of the particle filter.

In another aspect, the method may include measuring a first value for a differential pressure in the particle filter at the same time as determining that the particle filter is free of soot, and using the measured first value for the differential pressure to estimate a quantity of soot collected in the particle filter. As a result, a "start condition" (i.e., "clean filter") can be precisely determined, from which the estimating strategies can begin for calculating the soot load during operation of the internal combustion engine. A precise determination of this "start condition" increases how accurately the soot load is estimated by limiting the danger that the soot load will be underestimated owing to low measurements of the differential pressure (or flow resistance), which can lead to a delay in activating the necessary active regenerations, or be overestimated owing to high measurements of the differential pressure (or flow resistance), which can lead to frequent activations of unnecessary active regenerations.

In another aspect, the method may further include determining a value for a mileage of a motor vehicle system equipped with the internal combustion engine, and determining a quantity of ash that accumulated in the particle filter based on the measured first value for the differential pressure when the determined value for the mileage is greater than or equal to a threshold.

Given a specific mileage of the motor vehicle system at which the influence of the ash that accumulated in the particle filter on the pressure drop in the particle filter cannot be negligible, it is possible to regard the measured first value for the differential pressure in the particle filter, which is measured when the particle filter is with certainty free of soot, as the sum of a first contribution to the pressure drop caused by the clean particle filter brick and a second contribution to the pressure drop caused by the ash that accumulated in the particle filter brick. These two contributions can be used to correct the estimated soot load according to the estimating strategies disclosed above.

In addition, according to an aspect, the method may further include using the specific quantity of ash accumulated in the particle filter to estimate a remaining free volume or a remaining service life of the particle filter. As a result, a precise estimation of the remaining service life of the particle filter and/or its filtration efficiency can be set up in an exact manner, making it possible to apply expedient strategies for changing out the spent particle filter. The proposed solution essentially achieves the same effects as the method described above, and can be implemented with a computer program including a program code, to perform the method described above when executed on a computer. It may also be designed as a computer program product that contains the computer program. The method may also involve an electromagnetic signal modulated in such a way as to carry a sequence of data bits, which represent a computer program for implementing the method.

Another embodiment of the solution that achieves essentially the same effects as the method described above provides for an internal combustion engine including a particle filter and an electronic controller configured to measure a first value for an oxygen content in the exhaust gas upstream from the particle filter with a first oxygen sensor, which is arranged in an exhaust pipe upstream from the particle filter, measure a second value for an oxygen content in the exhaust gas downstream from the particle filter with a second oxygen sensor, which is arranged in the exhaust pipe downstream from the particle filter, and determine that the particle filter is free of soot when the second value for the oxygen content is equal to the first value for the oxygen content.

In one aspect, the electronic controller may be further configured to calculate a value for the quantity of soot that was combusted during regeneration of the particle filter from the beginning of regeneration to the determination that the particle filter is free of soot, and use the calculated value for the quantity of soot to correct a mathematical model for estimating a quantity of soot collected in the particle filter.

In another aspect, the electronic controller may be further configured to measure a first value for a differential pressure in the particle filter simultaneously to determining that the particle filter is free of soot, and use the measured first value for differential pressure to estimate a quantity of soot collected in the particle filter.

In addition, an embodiment of the present disclosure may be configured as a motor vehicle system, for example a passenger car, which is equipped with an internal combustion engine of the kind disclosed above.

Another embodiment of the present disclosure that essentially achieves the same effects as the method described above provides a device for controlling a regeneration of a particle filter of an internal combustion engine that is configured to measure a first value for an oxygen content in the exhaust gas upstream from the particle filter, measure a second value for an oxygen content in the exhaust gas downstream from the particle filter, and determine that the particle filter is free of soot when the second value for the oxygen content is equal to the first value for the oxygen content. As a result, the device can determine exactly when the particle filter is completely free of soot at the end of an active and/or passive regeneration.

The method can advantageously be applied in conjunction with the known strategies for monitoring the soot and/or ash load in the particle filter, such as those based on the pressure difference in the particle filter and/or based on the estimation of mathematical models, to precisely determine a "start condition" (i.e., "clean filter"), from which the strategies can begin to calculate the soot load. As a result, the strategies for monitoring the soot load as well as the entire management of the regeneration process can become more precise, which also means that the fuel consumption and/or the danger of failures due to an overloaded particle filter can be lowered.

In one aspect of this solution, the device is further configured to calculate a value for the quantity of soot that was combusted during the regeneration of the particle filter from when regeneration began to the time at which the particle filter was found to be free of soot, based on the measured first value and the measured second value for the oxygen content, and use the calculated value for the quantity of soot to correct a mathematical model for estimating a quantity of soot collected in the particle filter. As a result, a calculated value for the quantity of soot that was actually combusted during regeneration can be provided at the end of each regeneration, so that this actual, calculated value for the quantity of soot that was actually combusted can be compared with the soot load that was estimated by the mathematical models and/or based on measurements of the pressure difference in the particle filter. A suitable strategy for correcting the estimation models can be applied in the case of discrepancies between the estimated value and actual, calculated value. Therefore, this aspect has the effect of enabling an adaptive correction of the mathematical models used for estimating the soot load based on measurements of the oxygen content.

In another aspect, the device is configured to calculate the value for the quantity of soot combusted during the regeneration of the particle filter by calculating a first mass oxygen throughput based on the measured first value for the oxygen content and calculating a second mass oxygen throughput based on the measured second value for the oxygen content. The device is also configured to integrate a difference between the second mass oxygen throughput and first mass oxygen throughput over a period of regeneration. This aspect provides a very reliable solution for calculating the quantity of soot that is combusted during regeneration of the particle filter.

In another aspect, the device may further be configured to measure a first value for a differential pressure in the particle filter at the same time as determining that the particle filter is free of soot, and use the measured first value for the differential pressure to estimate a quantity of soot collected in the particle filter. As a result, a "start condition" (i.e., "clean filter") can be precisely determined, from which the estimating strategies can begin for calculating the soot load during operation of the internal combustion engine. A precise determination of this "start condition" increases how accurately the soot load is estimated by limiting the danger that the soot load will be underestimated owing to low measurements of the differential pressure (or flow resistance), which can lead to a delay in activating the necessary active regenerations, and overestimated owing to high measurements of the differential pressure (or flow resistance), which can lead to frequent activations of unnecessary active regenerations.

In another aspect, the device may further be configured to determine a value for a mileage of a motor vehicle system equipped with the internal combustion engine, and determine a quantity of ash that accumulated in the particle filter based on the measured first value for the differential pressure when the determined value for the mileage is greater than or equal to a threshold. Given a specific mileage of the motor vehicle system at which the influence of the ash that accumulated in the particle filter on the pressure drop in the particle filter cannot be negligible, it possible to regard the measured first value for the differential pressure in the particle filter, which is measured when the particle filter is with certainty free of soot, as the sum of a first contribution to the pressure drop caused by the clean particle filter brick and a second contribution to the pressure drop caused by the ash that accumulated in the particle filter brick. These two contributions can be used to correct the estimated soot load according to the estimating strategies disclosed above.

In addition, according to an aspect, the device may further be configured to use the specific quantity of ash accumulated in the particle filter for estimating a remaining free volume or a remaining service life of the particle filter. As a result, a precise estimation of the remaining service life of the particle filter and/or its filtration efficiency can be set up in an exact manner, making it possible to apply expedient strategies for changing out the spent particle filter.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
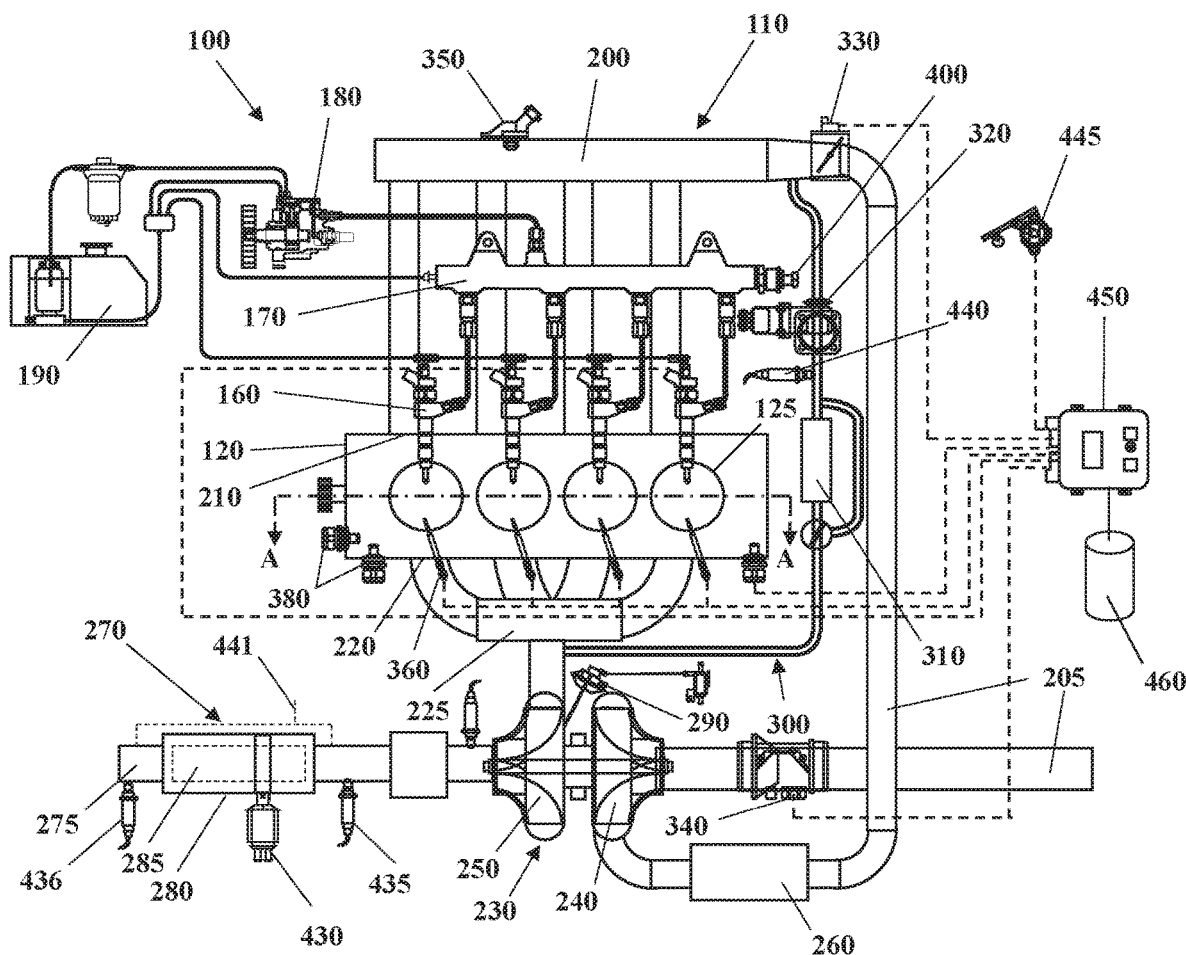
FIG. 1 shows a schematic plan view of an internal combustion engine.
Figure 2:
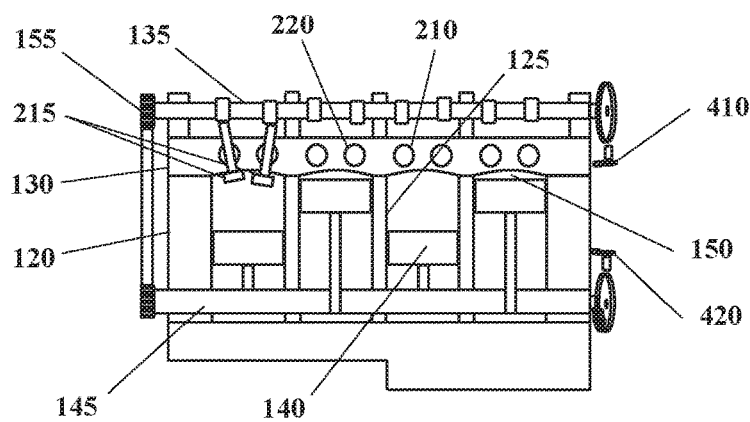
FIG. 2 shows a schematic cross-sectional view of the internal combustion engine taken at A-A on FIG. 1.

Several embodiments may include a motor vehicle system 100, which is shown in FIGS. 1 and 2, and has an internal combustion engine (ICE) 110. The ICE 110 can be a gasoline engine, for example a gasoline engine with direct injection (GDI). The ICE 110 has an engine block 120, which defines at least one cylinder 125 with a piston 140 having a coupling that turns the crankshaft 145. A cylinder head 130 works together with the piston 140 to define a combustion chamber 150. An air/fuel mixture may be introduced into the combustion chamber 150 and ignited, which leads to hot, expanding combustion gases that cause the piston 140 to move back and forth. The fuel is made available by at least one fuel injector 160, and the air by at least one inlet 210. The fuel exposed to a high pressure is guided from a fuel rail 170 connected as a fluid infeed to a high-pressure pump 180 that increases the pressure of the fuel coming from a fuel source 190 to the fuel injector 160. Each of the cylinders 125 has at least two valves 215, which are operated by a camshaft 135 that rotates together with the crankshaft 145. The valves 215 selectively let air from the inlet 210 into the combustion chamber 150, and alternatingly allow exhaust gases to exit through the exhaust 220. In several examples, a cam-phasing system 155 is used to selectively change the chronological sequence between the camshaft 135 and crankshaft 145.

The air can be fed to the air intake/air intakes 210 through an intake manifold 200. An air intake line 205 feeds ambient air to the intake manifold 200. In other embodiments, a throttle valve 330 can be selected to regulate the air flow to the intake manifold 200. Further embodiments utilize a system for compressed air, for example a turbocharger 230 with a compressor, which rotates together with a turbine 250. The rotation of the compressor 240 increases the pressure and temperature of the air in the line 205 and intake manifold 200. An intercooler 260 contained in the line 205 can reduce the temperature of the air. The turbine 250 rotates during the inflow of exhaust gases coming from an exhaust manifold 225, which guides exhaust gas from the exhaust 220 through a series of guide vanes, before it is expanded by the turbine 250. This example shows a turbine with variable geometry (VGT), having a VGT actuator 290 designed to move around the guide vanes or blades, so that the blades alter the flow of exhaust gas through the turbine 250. In other embodiments, the turbocharger 230 can have a fixed geometry and/or a wastegate.

The exhaust gases exit the turbine 250, and are guided to an exhaust system 270. The exhaust system 270 can include an exhaust pipe 275, which has one or more exhaust aftertreatment devices 280. Exhaust aftertreatment devices may be any devices that can be used to change the exhaust gas composition. The exhaust aftertreatment devices may include a particle filter 280, for example a gasoline particle filter, which is designed to collect soot and other particulate matter that is generated by fuel combustion and transported by the exhaust gases. The particle filter 280 is equipped with a brick 285, i.e., with a substrate used as a particle filter, which is suitable for collecting a certain quantity of soot and ash. Without being limited thereto, the aftertreatment devices may also include other devices, such as catalytic (two- and three-way) converters, oxidation catalysts, NOx traps for lean operation (lean NOx traps), hydrocarbon adsorbers and systems for selective catalytic reduction (SCR). Other embodiments involve an exhaust gas return system (EGR) 300, which is connected with the exhaust manifold 225 and intake manifold 200. The EGR system 300 can have an EGR cooler 310, to reduce the temperature of the exhaust gases in the EGR system 300. An EGR valve 320 regulates the flow of exhaust gases in the EGR system 300.

The motor vehicle system 100 may further include an electronic controller (ECM) 450, which communicates with one or several of the sensors and/or devices connected with the ICE 110. The ECM 450 receives input signals from various sensors designed to generate signals that are proportional to various physical parameters in conjunction with the IE 110. Without being limited thereto, the sensors may include an air mass flow and temperature sensor 340, a pressure and temperature sensor 350 for the manifold, a sensor 360 for the pressure in the combustion chamber, sensors 380 for the coolant and oil temperature and/or the accompanying fill level, a pressure sensor 400 for the fuel, a camshaft position sensor 410, a crankshaft position sensor 420, sensors 430 for the particle filter temperature, other sensors for the exhaust gas pressure and temperature, an EGR temperature sensor 440 as well as a position sensor 445 for the gas pedal.

The sensors may also include one or more pressure sensors 441 in the exhaust pipe 275, for example differential pressure sensors suitable for measuring differential pressure values between the pressure values upstream and downstream from the particle filter 280.

The sensors may also include a first oxygen sensor 435 (also referred to as Lambda sensor), for example a wide range air/fuel sensor (WRAF sensor), which is arranged in the exhaust pipe 275 upstream from the particle filter 280, to measure the oxygen content (or synonymously a so-called "Lambda" parameter) in the exhaust gases, which exit the combustion chamber 150 and enter the particle filter 280. The sensors may also include a second oxygen sensor 436 (also referred to as Lambda sensor), for example a wide range air/fuel sensor (WRAF sensor), which is arranged in the exhaust pipe 275 downstream from the particle filter 280, to measure the oxygen content (or synonymously a so-called "Lambda" parameter) in the exhaust gases, which leave the particle filter 280.

Furthermore, the ECM 450 may issue output signals to various controllers, to control the operation of the ICE 110, for example, but not exclusively, to the fuel injectors 160, to the throttle 330, to the EGR valve 320, to the VGT actuator 290 and to the cam-phasing system 155. It is noted that dashed lines are used to denote varying connections between the different sensors, devices and ECM 450 (e.g., data bus), wherein others have been omitted for purposes of clarity.

The controller 450 may have a digital microprocessor unit (CPU) that is data networked (e.g., on the data bus) with a memory system 460. The CPU is configured to execute commands stored as a program in the memory system 460, acquire input signals from the data bus and issue output signals to the data bus. The memory system 460 can have different storage media, such as optical, magnetic, solid state and other non-volatile media. The data bus can be configured to send analog and/or digital signals to the various sensors and controllers, receive them from the latter and modulate these signals. The program can be constituted in such a way for implementing the methods described herein, so that the CPU can execute the methods and thus control the ICE 110.

The program stored in the memory system 460 is sent to the controller from outside, either via cable or wirelessly. Outside of the motor vehicle system 100, it routinely appears on a computer program product, which in the field is also referred to as a computer- or machine-readable medium, and is to be understood as a computer program code on a carrier. The carrier can here be transitory or non-transitory in nature, so that reference can also be made to a transitory or non-transitory nature of the computer program product.

One example of a transitory computer program product is a signal, for example an electromagnetic signal like an optical signal, which is a volatile carrier for the computer program code. The computer program code can also be carried by modulating the signal with a conventional modulation process, such as QPSK, for digital data, so that binary data representing the computer program code are imprinted onto the volatile electromagnetic signal. For example, such signals are used when a computer program code is transmitted to a laptop by cable or via a Wi-Fi connection.

In the case of a non-transitory computer program product, the computer program code is embodied in a fixed storage medium. The storage medium is then the aforementioned non-transitory carrier, so that the computer program code is permanently or non-permanently retrievably stored in or on the storage medium. The storage medium can be a conventional type, for example as known in the area of computer technology, e.g., a flash memory, an Asic, a CD and the like. Instead of the engine controller 450, the motor vehicle system 100 can have another type of processor, to provide the electronic logic, e.g., an embedded controller, an on-board computer, or any other type of processor that can be used in a vehicle.

During normal operation of the ICE 110, combustion of the air/fuel mixture in the engine cylinder 125 generates a certain quantity of soot, which gradually is collected and accumulated in the particle filter 280. This soot accumulates in the brick 285 of the particle filter 280, and gradually clogs the particle filter 280, which must be regenerated by way of regeneration, i.e., a process in which the soot collected in the particle filter 280 is combusted.

For example, the ECM 450 is configured to prevent fuel from being introduced into the engine cylinder 125 each time the driver eases off the gas pedal, for example by keeping all fuel injectors 160 closed.

In this way, the ICE 110 goes through a so-called overrun cut-off phase, during which the sole effect of the pistons 140 moving back and forth in the corresponding cylinders 125 is to pump fresh air, and thus oxygen, from the intake manifold 200 through the exhaust system 270. When the ICE 100 is going through an overrun cut-off phase and the temperature of the particle filter 280 is high enough (e.g., exceeds 500° C.), the large amount of oxygen coming from the intake manifold 200 triggers a spontaneous combustion of the soot collected inside of the particle filter 280, resulting in a passive regeneration. However, if the conditions for passive regeneration are not satisfied, the soot continues to accumulate inside of the particle filter 280.

To handle this scenario, the ECM 450 is generally configured to activate a so-called active regeneration of the particle filter 280 when the quantity of collected soot has reached a predetermined maximum value. Active regeneration is a process in which the ECM 450 changes some of the operating parameters of the ICE 110, to actively increase the temperature of the particle filter 280 and/or the quantity of oxygen fed to it, with the objective of causing the collected soot to combust, even when the ICE 110 is not in an overrun cut-off phase. In particular, the ECM 450 can be configured to increase the quantity of oxygen fed to the particle filter 280 by increasing the air/fuel ratio of the air/fuel mixture introduced into the engine cylinder 125 (i.e., by making the air/fuel mixture leaner) and or by interrupting the fuel supply in one or several of the engine cylinders 125, so that these cylinders are no longer supplied with fuel, and their effect solely pumps fresh air and oxygen to the particle filter 280.

To properly manage the active regeneration, the ECM 450 can be configured to monitor the quantity of soot that accumulated inside of the particle filter 280 (i.e., the soot load). Known strategies for monitoring the soot load are based on measuring the pressure difference in the particle filter 280 and/or based on a mathematical model, which is configured to generate an estimated soot load based on several different engine operating parameters. For these strategies to yield precise results, however, the ECM 450 should be able to exactly determine when the particle filter 280 is completely free of soot, for example at the end of a passive or active regeneration.

Figure 3:
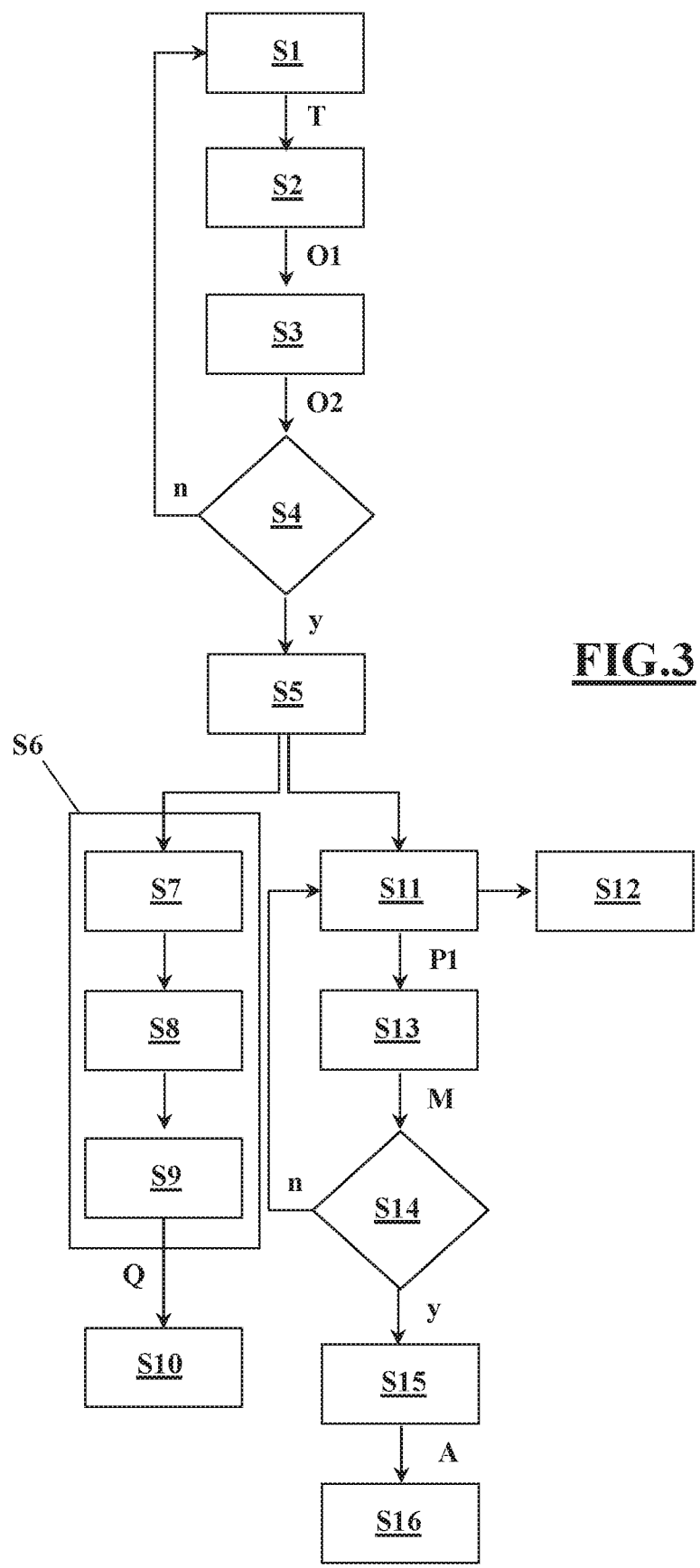
FIG. 3 is a flowchart illustrating a method for controlling a regeneration of a particle filter of the internal combustion engine.

To achieve this task, the ECM 450 can advantageously use the first oxygen sensor 435 and second oxygen sensor 436, which are arranged in the exhaust pipe 275 upstream or downstream from the particle filter 280. In particular, the ECM 450 can execute the control process depicted in the flowchart on FIG. 3, which can be periodically and/or cyclically repeated during normal operation or during regeneration of the particle filter 180.

Initially the ECM 450 determines a current value T for the temperature of the particle filter 280 at block S1. The current value T for the temperature of the particle filter 280 can be measured with the temperature sensor 430 or estimated based on other parameters, for example based on the temperature of the exhaust gases, which is measured by the exhaust gas sensors.

The ECM 450 determines a first value O1 for the oxygen content in the exhaust gas upstream from the particle filter 280 at block S2. For example, the ECM 450 determines the first value O1 by having the first oxygen sensor 435 measure a current value for the oxygen content in the exhaust gases emitted from the combustion chambers 150 before the latter enter the particle filter 280. The first value O1 for oxygen content can be expressed as a volume percentage of oxygen in the exhaust gases or as any other parameter (for example, the Lambda parameter) that represents the oxygen content.

The ECM 450 determines a second value O2 for the oxygen content in the exhaust gas downstream from the particle filter 280 at block S3. For example, the ECM 450 determines the second value O2, e.g., by having the second oxygen sensor 436 measure a current value for the oxygen content in the exhaust gases emitted from the particle filter 280. The second value O2 for oxygen content can be expressed as a volume percentage of oxygen in the exhaust gases or as any other parameter (for example, the Lambda parameter) that represents the oxygen content.

At block S4, the ECM 450 can be configured to check whether two conditions are satisfied simultaneously at this point in time. In a first condition, the value for the temperature T of the particle filter 280 is equal to or greater than a predetermined threshold (i.e., a minimum value Tmin for the temperature is present), which can initiate soot combustion inside of the particle filter 280. Expressed differently, the minimum value Tmin for the temperature of the particle filter is a threshold. If the temperature of the particle filter is equal to the minimum value Tmin, the soot accumulated in the particle filter 280 combusts. By contrast, if the temperature of the particle filter is less than the minimum value Tmin, the soot accumulated in the particle filter 280 remains uncombusted.

The minimum value Tmin for the temperature of the particle filter can be a calibration value, such as a predetermined experimental value, which is stored in the memory system 460 connected with the ECM 450. Generally stated, the minimum value Tmin for the temperature of the particle filter can measure about 500° C. If this first condition is satisfied, the value for the temperature T of the particle filter 280 can in practice be equal to or greater than the minimum value Tmin.

In a second condition, the oxygen content in the exhaust gas is high enough to initiate a combustion of the soot accumulated in the particle filter 280. In other words, the measured second value O2 for oxygen content is equal to the measured first value O1. In practice, the second condition involves not observing any fluctuation in the oxygen content in the particle filter 280.

If these two conditions are satisfied at the same time, the ECM 450 can finally determine at block S5 that the particle filter 280 is completely free of soot. In other words, the regeneration of the particle filter 280 has successfully concluded when (i) the content of the oxygen emitted from the combustion chamber 150 is high enough to initiate a combustion of the soot accumulated in the particle filter 280 and if the oxygen content is equal to or greater than a predetermined threshold; and (ii) the oxygen content of the exhaust gas emitted from the particle filter 280 is equal to the oxygen content entering into the particle filter 280, thus indicating that, despite the favorable thermal passive regeneration conditions, no soot combustion is actually taking place in the particle filter 280, and no more combustible soot is present inside of the particle filter 280.

If the ECM 450 determines that the particle filter 280 is free of soot upon successful regeneration, the method now provides that the ECM 450 implement two control strategies, which are disclosed below. In a first control strategy, the ECM 450 calculates a value Q for the quantity of soot at block S6 that was combusted during the just completed regeneration of the particle filter 280 from the beginning of the regeneration up until the determination that the particle filter 280 is free of soot. The value Q for the quantity of soot that combusted during the just completed regeneration is calculated based on the first value O1 and second value O2 for oxygen content, which were measured during the regeneration. In particular, the ECM 450 is configured to calculate a first absolute mass oxygen throughput based on the first value O1 for oxygen content and the mass throughput of the exhaust gas at block S7.

For example, the ECM 450 can determine the mass exhaust gas throughput of the ICE 110 based on a mass throughput of the air entering the ICE 110 and a fuel feed rate of the ICE 110. To this end, the ECM 450 can receive the mass air throughput from the air mass flow and temperature sensor 340 and the fuel feed rate from a fuel gauge, which determines the mass throughput of fuel through the fuel rail 170. The mass exhaust gas throughput can be based on the sum of a mass throughput of the air entering the ICE 110 and a fuel feed rate of the ICE 110 (or be equal to the latter). In addition, the ECM 450 is configured to calculate a second absolute mass oxygen throughput based on the second value O2 for oxygen content and the mass exhaust gas throughput at block S8.

After the first absolute mass oxygen throughput and second mass oxygen throughput have been calculated, the ECM 450 calculates the value Q for the combusted quantity of soot by integrating a difference between the second absolute mass oxygen throughput and the first absolute mass oxygen throughput over the period of regeneration at block S9, which is the time from the beginning of regeneration up to the time at which the particle filter 280 was found to be free of soot at block S9. The calculated value Q for the quantity of combusted soot is the precise value for the quantity of soot that was collected in the brick 285 of the particle filter 280 before the just ended regeneration.

Therefore, the calculated value Q for the quantity of combusted soot can be compared with the estimated value for soot quantity, which is determined using known monitoring strategies. The calculated value Q is subsequently stored in the memory system 460, and used at block S10 to correct the mathematical models stored in the memory system 460, which are configured to deliver and generate an estimated soot load.

In practice, the ECM 450 is configured to use the calculated value Q for controlling the soot load estimation via back coupling. Expressed differently, the ECM 450 can be configured to perform the next soot load estimates and for this purpose control and activate future active regenerations based on the calculated value Q for soot quantity.

A second control strategy provides that the ECM 450 measures a first value P1 for the differential pressure across the particle filter at block S11 simultaneously to determine that the particle filter 280 is free of soot. The first value P1 for differential pressure can be measured by the pressure sensor 441. This first value P1 for differential pressure is measured as soon as it is determined that the particle filter 280 is free of soot at the end of a regeneration, and can be used to correct the known control strategies that were used to estimate the soot load based on measuring the pressure difference in the particle filter 280.

In particular, the first value P1 for differential pressure is used by the ECM 450 to estimate the soot quantity (soot load) accumulated in the particle filter 280 at block S12. For example, the estimated soot quantity (soot load) can be calculated as a function of a difference between an actual value (raw value) for the differential pressure in the particle filter 280, which is continuously measured by the pressure sensor 441, for example during normal operation of the ICE, and the first value P1 for the differential pressure.

The first value P1 for differential pressure measured once the particle filter 280 is with certainty free of soot is the sum of a contribution by the counter-pressure of the brick (i.e., a pressure drop caused by the completely clean brick 285 of the particle filter 280, which has been aged through constant use) and a contribution by the ash (i.e., a pressure drop caused by the ash collected in the brick 285 of the particle filter 280). As disclosed above, the estimated quantity of soot accumulated in the particle filter 280, which is adaptively corrected by considering the real pressure drop caused by the clean brick and ash poisoning the brick, is used to initiate an active regeneration once the newly estimated quantity of collected soot has reached the predetermined maximum value.

In addition, the method can provide that the ECM 450 determine a value M for the mileage of the motor vehicle system 100 at block S13. The mileage can be measured by the ECM 450 using an odometer. The ECM 450 can be configured to check whether the determined value M for mileage is greater than or equal to a threshold at this time at block S14. This threshold for the mileage of the motor vehicle system 100 can be a calibration value, which is an experimentally-predetermined value, and subsequently stored in the memory system 460 connected with the ECM 450. In particular, the threshold for the mileage is a mileage value below which the ash quantity accumulated in the brick 285 of the particle filter 280 (or the resultant pressure drop) is negligible.

If the determined value M for mileage is greater than or equal to the threshold, it means that an ash quantity accumulated in the brick 285 of the particle filter 280 becomes relevant. In this case, the ECM 450 can be configured to determine a quantity A for the ash accumulated in the particle filter 280 based on the measured first value P1 for differential pressure at block S15, which is measured as soon as the particle filter 280 has been deemed free of soot at the end of regeneration, and if the motor vehicle system 100 has covered a mileage greater than its threshold.

With respect to the first value P1 for differential pressure measured as disclosed above, the ECM 450 is configured to differentiate between the contribution by the ash and the contribution by the counter-pressure of the brick, to determine the ash quantity A based on the ash contribution. In practice, the ash contribution can be calculated as the difference between the following: between the just measured first measured value P1 for differential pressure and the first measured value P1 for differential pressure, which was measured during the first time or measured when the mileage was less than the threshold, or a value for the differential pressure of the counter-pressure of the brick as read out of a characteristic diagram stored in the storage system 460.

After the ash quantity A has been determined, the ECM 450 can monitor the rise in ash quantity A during the service life of the particle filter 280. In practice, the ECM 450 can use the determined ash quantity A accumulated in the particle filter 280 at block S16 to estimate a remaining free volume or a remaining service life of the particle filter 280. In particular, the ECM 450 can calculate the volume of the brick 285 of the particle filter 280 occupied by the ash collected therein based on the determined ash quantity A. As a consequence, the remaining free volume of the brick 285 of the particle filter 280 can be calculated as the difference between an initial free volume of the (new) brick 285 of the particle filter 280 (stored in the memory system 460) and the volume of the brick 285 of the particle filter 280 that is occupied by the ash collected therein. The ECM 450 can thus be configured to determine that the particle filter 280 is depleted once the remaining free volume or remaining service life is less than a predetermined threshold. The threshold can be a calibration value, which is predetermined in a test and subsequently stored in the memory system 460 connected with the ECM 450.

The ECM 450 can be configured to execute one or several actions once it has been determined that the particle filter 280 is depleted. Without being limited thereto, these actions can involve generating a signal perceivable by the driver, for example by activating a beeper (e.g., a light and/or tone) arranged in a dashboard of the motor vehicle system 100. In this way, the driver can be informed about the depleted particle filter 280, and given a recommendation to take counter-measures, for example to find the nearest auto repair shop.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

The invention claimed is:

1. A method for controlling a regeneration of a particle filter of an internal combustion engine in a motor vehicle system comprising:
    measuring a first value for the oxygen content in an exhaust gas upstream from the particle filter;
    measuring a second value for the oxygen content in the exhaust gas downstream from the particle filter;
    assigning a soot-free state to the particle filter when the second value is equal to the first value;
    calculating a value for a quantity of soot combusted during a regeneration cycle of the particle filter over a regeneration time period from when regeneration began to when the particle filter was assigned the soot-free state; and
    correcting a mathematical model for estimating the quantity of soot collected in the particle filter using the calculated value for the quantity of soot.

2. The method according to claim 1, wherein the step of calculating the value for the quantity of soot combusted during the regeneration of the particle filter comprises:
    calculating a first mass oxygen throughput based on the measured first value for the oxygen content;
    calculating a second mass oxygen throughput based on the measured second value for the oxygen content; and
    integrating a difference between the second mass oxygen throughput and first mass oxygen throughput over the regeneration time period.

3. The method according to claim 1, further comprising:
measuring a first value for a differential pressure in the particle filter when the particle filter is assigned the soot-free state; and
estimating the quantity of soot collected in the particle filter based on the measured first value for the differential pressure.

4. The method according to claim 3, further comprising estimating a remaining service life of the particle filter based on the estimate quantity of soot collected in the particle filter.

5. A computer program product comprising a non-transitory computer-readable medium having a computer program with programming instructions, which when executed on a computer, performs the method according to claim 1.

6. A method for controlling a regeneration of a particle filter of an internal combustion engine in a motor vehicle system comprising:
measuring a first value for the oxygen content in an exhaust gas upstream from the particle filter;
measuring a second value for the oxygen content in the exhaust gas downstream from the particle filter;
assigning a soot-free state to the particle filter when the second value is equal to the first value;
measuring a first value for a differential pressure in the particle filter when the particle filter is assigned the soot-free state;
estimating a quantity of soot collected in the particle filter based on the measured first value for the differential pressure;
determining that a mileage value for the motor vehicle system is equal to or greater than a threshold mileage value; and
determining a quantity of ash accumulated in the particle filter based on the measured first value for the differential pressure in response to the mileage value being equal to or greater than the threshold mileage value.

7. An internal combustion engine comprising:
an exhaust system having a particle filter;
a first sensor in the exhaust system upstream of the particle filter;
a second sensor in the exhaust system downstream of the particle filter; and
an electronic controller operably coupled to the first and second sensor and configured to:
measure with the first sensor a first value for an oxygen content in the exhaust gas upstream from the particle filter;
measure with the second sensor a second value for an oxygen content in the exhaust gas downstream from the particle filter;
assign a soot-free state to the particle filter when the second value is equal to the first value;
calculate a value for a quantity of soot combusted during a regeneration cycle of the particle filter over a regeneration time period from when regeneration began to when the particle filter was assigned the soot-free state; and
correct a mathematical model for estimating the quantity of soot collected in the particle filter using the calculated value for the quantity of soot.

8. The internal combustion engine according to claim 7, wherein the electronic controller is further configured to:
measure a first value for a differential pressure in the particle filter when the particle filter is assigned the soot-free state; and
estimate the quantity of soot collected in the particle filter based on the measured first value for the differential pressure.

9. The internal combustion engine according to claim 8, wherein the electronic controller is further configuring to:
determine a mileage value for the motor vehicle system; and
determine a quantity of ash accumulated in the particle filter based on the measured first value for the differential pressure when the mileage value is equal to or greater than a threshold mileage value.

10. The internal combustion engine according to claim 8, wherein the electronic controller is further configuring to estimate a remaining service life of the particle filter based on the estimate quantity of soot collected in the particle filter.

* * * * *